E. O. P. Andrews,
Steering Apps.

No. 5,700. Patented Aug. 10, 1848.

UNITED STATES PATENT OFFICE.

EZEKIEL O. P. ANDREWS, OF BOSTON, MASSACHUSETTS.

SPRING-CLUTCH APPLIED TO A RUDDER-HEAD.

Specification of Letters Patent No. 5,700, dated August 10, 1848.

*To all whom it may concern:*

Be it known that I, EZEKIEL O. P. ANDREWS, of Boston, in the county of Suffolk and State of Massachusetts, have invented a new and Improved Apparatus for Steering Vessels; and I do hereby declare that the following is a full and exact description of the construction and operation of the same, reference being had to the annexed drawings, making part of this specification, in which—

Figure 1:
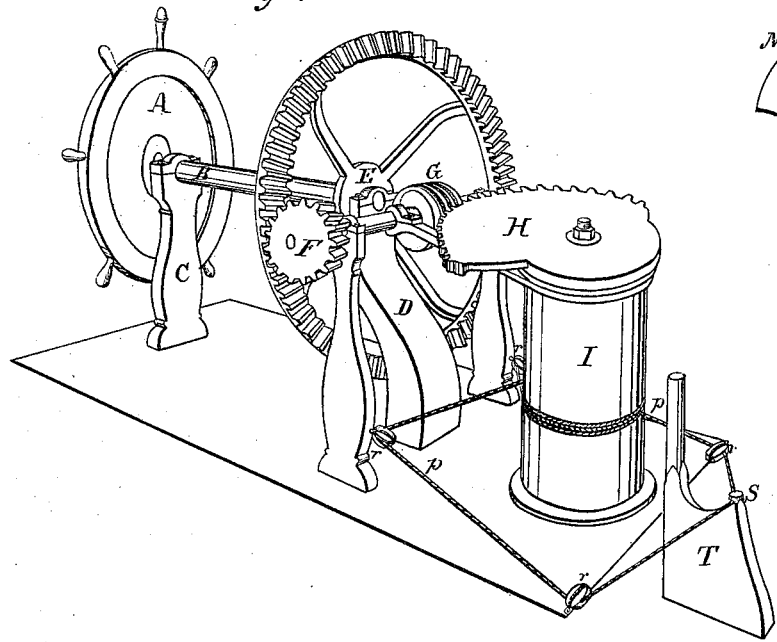
Figure 3:
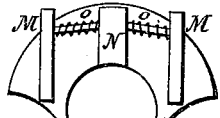
Figure 2:

Figure 1 is a perspective view, Fig. 2 a horizontal section of the clutch at the helm-post, and Fig. 3 is an inverted section showing a substitute for the clutch.

A steering wheel A of ordinary construction, is mounted on the forward end of a longitudinal horizontal shaft B, which is supported by two posts C D, which rise from a platform, floor, or vessel's deck; and near the rear, or aft end of the shaft is mounted a large gear-wheel E, the teeth of which take to those of a pinion F, which is mounted on the end of a transverse horizontal shaft; and on the center of this shaft is a revolving screw G, the thread of which take to the teeth of a gear sector H, which is mounted on the head of a vertical shaft or helm-post I. This gear sector is not firmly attached to the helm-post, but is connected thereto by a peculiar clutch, represented in Fig. 2, in which J is a center pivot or round tenon which ascends through the gear sector; the section K K K K is attached to the sector, but the sections L L L L are elevated tenons, or prominent parts of the helm-post. Between the tenons L and the wings K curved steel springs are adjusted, and prevent the tenons from impinging directly upon the wings, and relieves each from violent concussions. Instead of this arrangement, I shall sometimes construct the gear-sector with two cleats on the underside, as represented M M, Fig. 3, and with a tiller-beam N firmly attached to the helm-post, and extending between the cleats. The cleats are connected to each other by a curved iron rod which pass freely through the beam, and is inclosed by two helical springs O O, which connect the beam to the cleats. When this apparatus is applied to sailing vessels, the rudder post of the vessel constitutes the helm-post of the machine, or is attached thereto; but when it is used for steering steam vessels, a rope P P is attached to the helm-post, passing around the same, and thence through the blocks *r r* to the rear head (or after head) *s*, of the rudder T; or the rope (or chain) may be conducted through any number of blocks, in any position required, to conduct the same to the rudder.

What I claim as my invention, and desire to secure by Letters Patent, is—

The spring clutch represented in Fig. 2 as applied for the purpose of relieving the sector and other parts of the apparatus from sudden and violent concussions or strains.

EZEKIEL O. P. ANDREWS.

Witnesses:
RUFUS PORTER,
STEPHEN T. PORTER.